Dec. 10, 1935.  E. J. KINGSBURY  2,023,842
HYDRAULIC FEEDING APPARATUS FOR MACHINE TOOL UNITS
Filed July 15, 1932  4 Sheets-Sheet 3
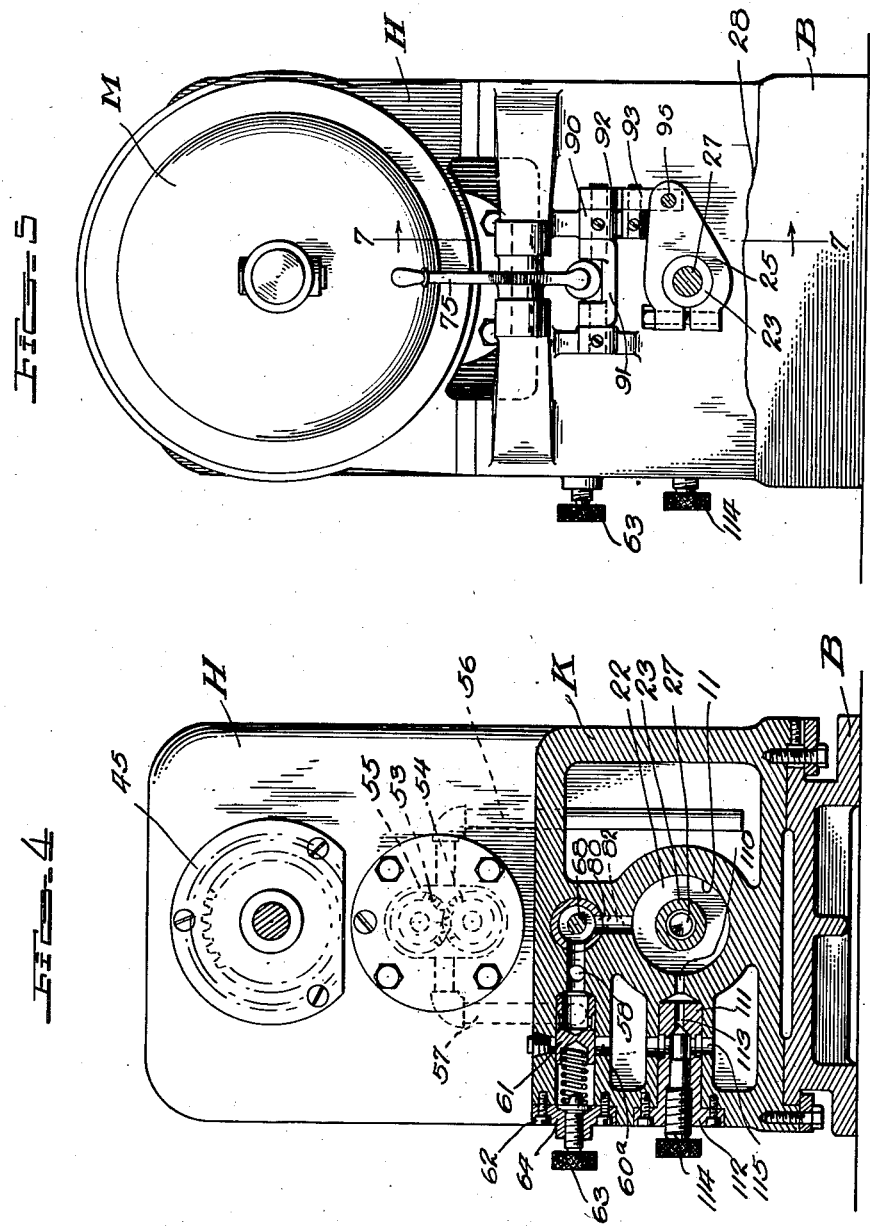
Inventor
Edward J. Kingsbury,
By
Attorneys.

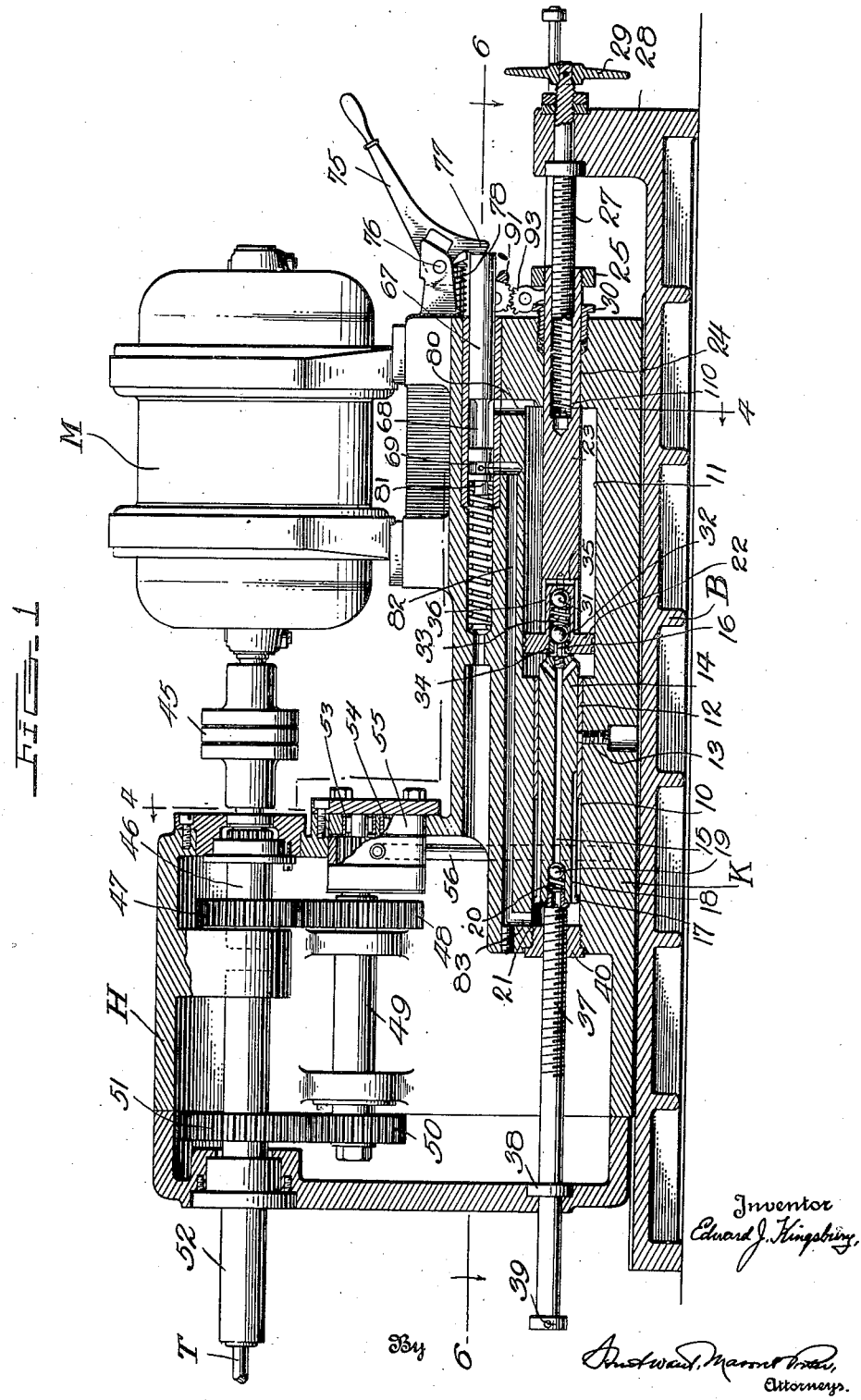

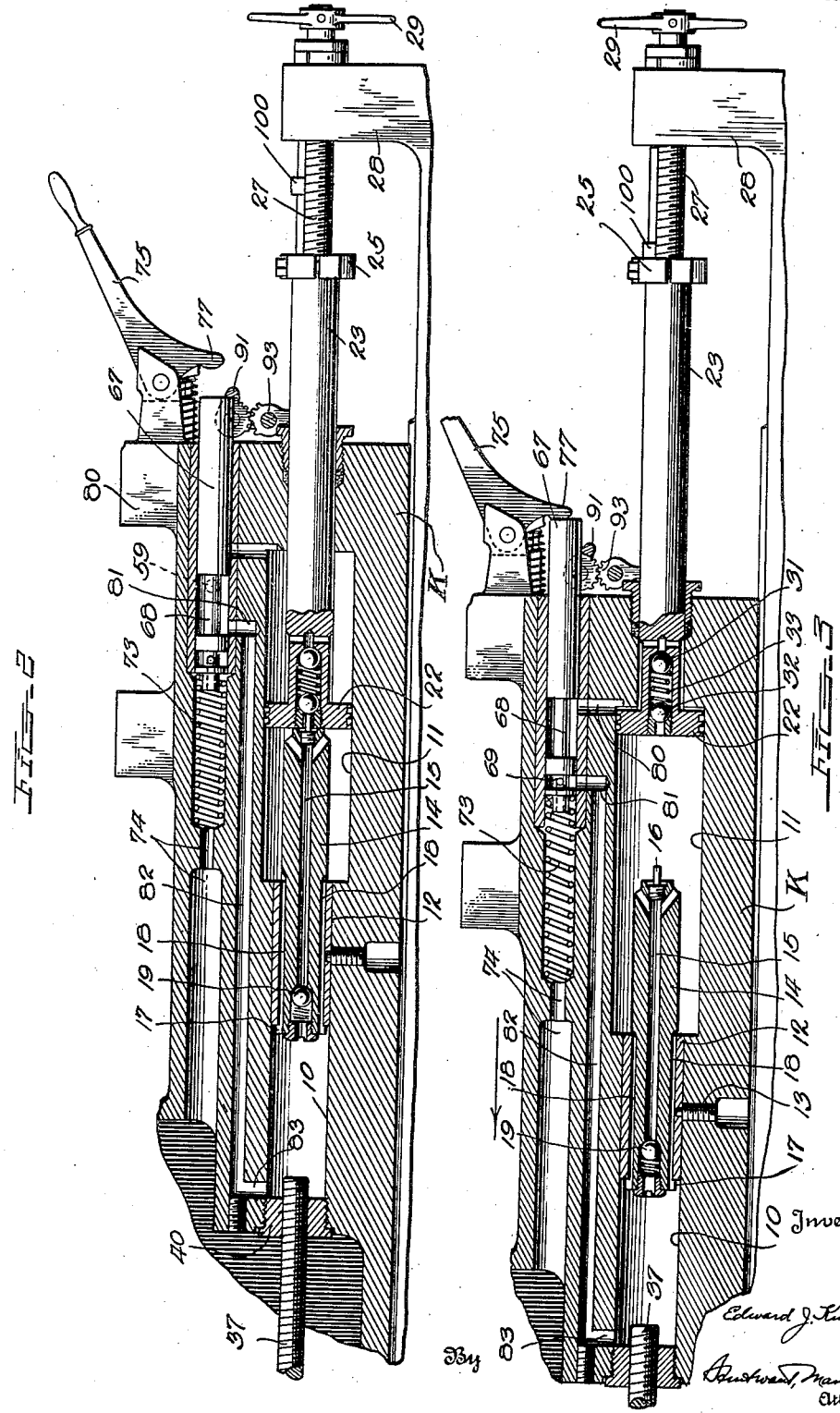

Dec. 10, 1935. E. J. KINGSBURY 2,023,842
HYDRAULIC FEEDING APPARATUS FOR MACHINE TOOL UNITS
Filed July 15, 1932 4 Sheets-Sheet 4
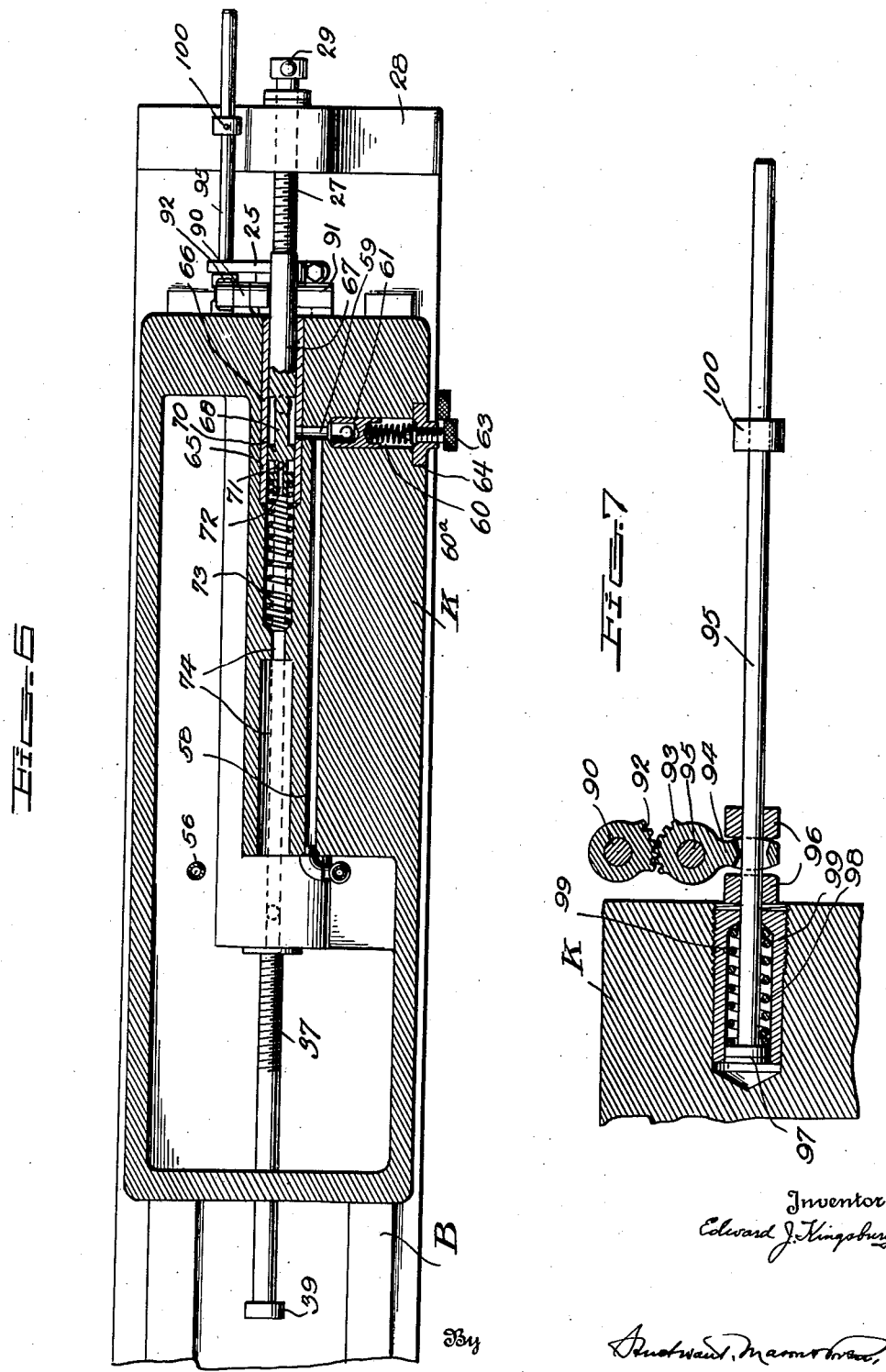

Patented Dec. 10, 1935

2,023,842

UNITED STATES PATENT OFFICE 2,023,842

HYDRAULIC FEEDING APPARATUS FOR MACHINE TOOL UNITS

Edward Joslin Kingsbury, Keene, N. H., assignor to Kingsbury Machine Tool Corporation, Keene, N. H., a corporation of New Hampshire Application July 15, 1932, Serial No. 622,786

14 Claims. (Cl. 121—45)

This invention relates to improvements in hydraulic feed apparatus for machine tool units, and more particularly concerns an apparatus of this type in which two pistons are employed for accomplishing and controlling the feeding and withdrawal of a tool with respect to the work.

One of the features of the present invention is the provision of two independent pistons of which one operates in conjunction with its cylinder for accomplishing and controlling the feeding and withdrawal of the tool, while the other operates to determine the feeding and withdrawal movements, and their rate and sequence, in conjunction with the first piston.

Another feature of the present invention is the employment of a large piston for producing the feeding and withdrawal motion, in conjunction with a small piston operating as a stop and valve structure for controlling the motion.

A further feature of the present invention is the provision of means for relieving the oil pressure upon the completion of a cycle, whereby to avoid unnecessary or excessive heating of the fluid while the feeding system is at rest.

Other features of the invention relate to the specific form, arrangement and construction of the several parts and will appear in detail in the following specification and claims.

An illustrative form of practicing the invention is set forth in the accompanying drawings, in which:

Figure 1 is a vertical longitudinal sectional view through a machine tool unit including a hydraulic feeding apparatus according to the present invention.

Figures 2 and 3 are fragmentary similar views, showing other positions of the parts.

Figure 4 is a transverse vertical section substantially on line 4—4 of Figure 1.

Figure 5 is an end elevation of the rear of the unit.

Figure 6 is a horizontal sectional view substantially on line 6—6 of Figure 1.

Figure 7 is a fragmentary vertical longitudinal sectional view substantially on line 7—7 of Figure 5.

In the drawings, the apparatus is shown as comprising a stationary bed B and a tool structure K which is slidable on the bed in a longitudinal direction thereof, being guided by the gib-and-key devices shown in Figure 4. This tool structure K comprises a body providing cylinders for the hydraulic pistons, a driving motor M, and a housing H containing the gearing for driving the tool T (illustrated as a drill) and the pump for establishing the hydraulic pressure for the feed apparatus.

The body of the tool structure K provides a small cylinder 10 and a large cylinder 11 which are co-axially disposed and formed as extensions one of the other. The small cylinder 10 receives a sleeve 12 which is held in fixed position by a set screw 13, for supporting the smaller piston 14, which has a longitudinal passage 15 therethrough opening by branch passages at its right hand end (Fig. 1) into the cavity of the large cylinder 11, and provided at its right hand end with a projecting pin 16. The left hand end of the small piston is provided with a peripherally projecting stop flange 17 for engaging the left hand wall of the bushing 12. Longitudinal grooves 18 are provided in the small piston 14 and flange 17, these grooves being of greater length than the bushing 12 so that they establish communication along the length of the piston when the latter is in its right hand position. The left hand end of the small piston 14 also has a cavity to receive a ball check valve 19 and its retaining spring 20, these parts being held in position by an apertured end plug 21, and serving to prevent passage of fluid through the central channel 15 of the piston 12, from left to right.

The large piston 22 is illustrated as integral with a piston rod 23 of lesser diameter which extends through a correspondingly-diametered passage 24 co-axial with the two cylinders, and being provided at its end with a clamping and stop piece 25. An internally threaded cavity 26 in the right hand end of piston rod 23 engages with a screw 27 revolubly mounted in an upstanding bracket 28 of the bed B, and provided with a knob 29 by which it may be revolved. A packing 30 is provided to prevent the escape of oil from the right hand end of the large cylinder 11. The piston 22 and its rod 23 have a recess at the left hand end for containing the ball check valves 31, 32 which are actuated in opposite directions by a single spring 33 and serve to obstruct the passage of oil through the apertured end closing plug 34 and the transverse escape channels 35. Longitudinal grooves 36 are provided from the left hand face of the large piston 22 to a point beyond the escape channels 35.

A threaded spindle 37 is rotatably mounted in an aperture of the front face of the housing H and provided with a collar 38 and a head 39 engageable by a spanner wrench or a like tool for rotating the spindle. The right hand threaded end or spindle 37 extends through an externally threaded closing plug 49 for the small cylinder 10.

The motor M operates through a universal connection 45 to drive a shaft 46 having a gear 47 thereon in mesh with a gear 48 on a back shaft 49 having a gear 50 in mesh with a gear 51 on the tool shaft 52. Thus the motor M may drive the tool at a speed determined by the ratios of the gears 47—48 and 50—51. Back shaft 49 is provided with an extension connected with the upper gear 53 of a gear pump having a lower gear 54 and a housing 55, and provided with a suction connection 56 from a sump in the lower part of the tool structure K and a delivery pipe 57 leading (Fig. 6) to a longitudinal passage 58 in the body of the tool structure K, and opening into a transverse fluid passage 59 having an enlarged portion 60 at its outer end (Figs. 4 and 6) containing a sliding valve 61 held inwardly by a spring 62 which may be adjusted by the screw 63 held by the closing plug 64, and operating normally to close the discharge passage 60*a*. The inner end of passage 59 opens into a longitudinal valve passage 65 having a fixed valve sleeve 66 therein with an opening opposite the passage 59 (Figs. 4 and 6), and containing a valve plunger 67 having a longer reduced portion 68 and a short reduced portion 69 separated by a collar 70, the short reduced portion 69 being closed off in the valve sleeve 66 by a collar 71. A central longitudinal passage 72 in the valve plunger 67 opens to the left hand end of the plunger and to the space provided by the reduced portion 69. A coil spring 73 constantly urges the valve plunger toward the right in the figures, and is contained within a reduced extension of the valve passage 65, which has an extension 74 discharging back into the sump of the body of the tool structure K. The valve plunger 67 may be moved manually toward the left in the figures by a crank lever 75 mounted by a pivot 76 on the tool structure and having a depending nose 77 directly engaged with the right hand end of the valve plunger 76. A plunger spring 78 moves the crank lever 75 in a counter-clockwise direction and normally holds it in the positions shown in Figures 1, 2, and 3.

When the valve plunger is in the extreme right hand position (Fig. 1) the space surrounding the longer reduced portion 68 communicates a short passage 80 with the right hand end of the large cylinder 11, and the space surrounding the shorter reduced portion 69 communicates by a passage 81 and the longitudinal passage 82 and the passage 83 with the left hand end of the small cylinder 10. When the plunger is moved to its right hand position (Fig. 2), the passage 81 is in communication with the space surrounding the longer reduced portion 68 of the plunger valve 67, while the passage 80 is cut off.

A transverse shaft 90 carries a latch piece 91 (Figs. 1, 2, 3, and 5) which may rock in a counter-clockwise direction from the position of Fig. 1 into the position of Fig. 2, when the valve plunger is moved to its left hand position and thus prevent the return movement of the valve plunger. The shaft 90 is provided with teeth 92 in mesh with teeth 93 on an apertured swinging arm 94 mounted by pivot 95 on the tool structure, and by its aperture embracing the control rod 95 between the two collars 96 thereon. The control rod extends into a recess within the body of the tool structure K (Fig. 7) and is provided at its inner end with a peripheral flange 97 operating during the movement of the control rod 95 toward the right to compress a coil spring 98 contained within the threaded bushing 99. A stop 100 is provided on the control rod 95 for determining the movement of the control rod, and its limit of travel.

A transverse passage 110 opening from the large cylinder 11 at its right hand end communicates with a larger passage 111 containing a hollow internally threaded plug 112 providing a needle valve passage 113 which may be regulated from the exterior by a threaded and adjustable needle valve 114 (Fig. 4), with a permitted escape of the liquid passing this needle valve through passages 115 back to the machine sump.

The operation of this hydraulic feed apparatus is as follows:

With the parts adjusted to cause the several movements at the desired points of travel, and assuming that the tool has been entirely withdrawn from the work and hence is in its extreme right hand position, corresponding to Figure 1, the rotation of the motor M causes an operation of the pump 53, 54, 55 and a delivery of fluid under pressure into the longitudinal passage 58. This fluid is regulated in its maximum pressure by the operation of valve 61 and spring 62, so that upon exceeding a predetermined pressure, the fluid may escape back to the sump through the opening 60*a*. In the position of Figure 1, however, this fluid may pass through channel 59 to the space surrounding the longer reduced portion 68 of the valve plunger 67, into the right hand end of the large cylinder 11, and operate to maintain the tool structure K in its right hand moved position. At this time, however, the check valve 32 is being held open by the pin 16 on the small piston 14, so that the fluid in the right hand end of the large piston 11 may open the spring check valve 31, and flow past the open valve 32 into the left hand end of the large cylinder 11 and thence by the branch passages into the longitudinal passage 15 of the small piston 14, past the check valve 19 thereof, to the left hand end of the small cylinder 10 and thence by passages 83, 82, and 81 to the space around the shorter reduced portion 69, and by the passage 72 therein to passages 74 and thus back to the sump. Thus a constant circulation of oil through the cylinders and relief valves 31 and 19 and control valve plunger 67 can occur to avoid overheating while the device is resting in its extreme withdrawn or returned position.

When an article of work is in position to be operated upon, the attendant momentarily depresses the crank lever 75. The nose 77 moves the valve plunger 67 to its extreme left hand position, until the latch piece 91 snaps behind it. These parts are now in the position of Figure 2. Fluid from the longitudinal passage 58 still continues to pass into the space surrounding the longer reduced portion 68, but now moves through passages 81, 82, 83 to the left hand end of small cylinder 10 and thus operates against the left hand end of the small piston 14, producing a bodily leftward movement of the tool structure K by the reaction of the fluid under pressure. The fluid at the right of the piston 22 can force the check valve 31 open, as the cylinder moves toward the left; and since pin 16 is now holding the check valve 32 open, the fluid can move from the right-hand face of piston 22 to the left-hand face, under the differential of pressures existing between the two faces of the piston 22. The cross section of the piston 14 and the piston rod 23 are shown illustratively as of substantially the same area. The two pistons remain in fixed abutting relationship. This produces a rapid preliminary feeding movement of the tool until it attains a close proximity to the work At the end of this predetermined approach movement the peripheral flange 17 on the small piston 14 engages the sleeve 12 and further relative movement between the tool structure K and the small piston 14 is prevented. At this time, however, the longitudinal passages 18 have established communication between the left hand end of the small cylinder and the left hand end of the large cylinder 11 so that the continued flow of fluid into the cylinder 10 is accompanied by a passage of the fluid into the left hand end of the large cylinder 11 and a pressure thereof against the left hand face of the large piston 22 and its rod 23, which are held in a fixed position relative to the bed by the adjustment of the threaded spindle 27. Hence the tool structure K continues to move in a feeding direction, but owing to the reduced size of the passages 18, and the fact of the presence of oil in the right hand end of the large cylinder 11 owing to the closure of the passage 80 by the valve plunger 67, this movement is slow. The oil content within the right hand end of the large cylinder 11 can only escape through the lateral passage 110 and past the needle valve 114 at a rate controlled by this needle valve, since the pressure in the longitudinal channel 58 is maintained at a contant maximum by the operation of the valve 61 (Figs. 4 and 6). Hence a slow feeding of the tool occurs while the work is being operated upon by the tool. During the first portion of this movement, the tool structure K draws the small piston 14 away from the large piston 22, so that the pin 16 withdraws from the valve 32 and permits the latter to close to accomplish the aforesaid sealing of the right hand end of the large cylinder 11.

At the close of this feeding movement the tool structure and pistons are in the relative position shown in Figure 3. The movement of the tool structure has carried the control rod 95 therewith until the collar 100 has engaged the limit and clamping piece 25, the relationship of these parts being shown in Figures 5 and 6, so that the final movement leftward of the tool structure K has resulted in a stoppage and retaining of the control rod 95 against the action of spring 96, so that the arm 94 is rocked and its teeth 93 cause a movement of teeth 92 and a movement of the latch piece 91 in a clockwise direction, so that the plunger 67 is liberated and is returned to its right hand position by the spring 73. Communication is thus established from longitudinal passage 58 past the longer reduced portion 68 to passage 80 and thus to the right hand end of the larger cylinder 11: while the longitudinal passage 82 is again placed in communication (Figs. 1 and 3) with the space around the shorter reduced portion 69. Fluid now flows through the passage 80 and causes a reaction between the right hand face of the large piston 22 and the right hand end wall of the large cylinder 11, so that the tool structure K is drawn rapidly back in a rightward position to withdraw the tool from the work. During the preliminary portion of this flow, the check valve 19 and the friction in passages 15 and 18 impose a resistance to the flow of the fluid from the right hand face to the left hand face of the small piston 14, and by reason of the pressure differentials at the ends of this small piston 14, it is moved relative to its cylinder (relatively toward the left from the position of Fig. 3). A short travel of piston 14 closes the passages 18, so that a greater resistance is opposed to the flow of the fluid from the left-hand end to the large cylinder back to the sump, as all of the fluid must now pass through the passage 15 and by the valve 19. The result is a rapid return of the piston 14 until it is stopped by the spindle 37, and thereafter the valve 19 continues to permit the escape of fluid from the left hand end of the cylinder 11. It will be understood, however, that the frictional and valve resistances opposed to this flow of fluid is much lower than the resistance provided by the needle valve 114, so that the full discharge of the pump into the right-hand end of the cylinder 11 is not resisted by a high back pressure opposed to the escape from the left-hand end (as was the reverse case during the slow forward feeding) nor does the small flow through the passage 110 predominate, and thus the return movement of the tool body toward the right occurs at a rapid rate. Finally, the pin 16 is brought against the valve 32 and opens this valve, so that fluid can now pass from the right-hand end of cylinder 11, past the check valve 31, past the open valve 32, through the left-hand end of cylinder 11, through passage 15 and past valve 19, and thus by passages 83 and 82, etc. back to the sump. Thus, ultimately, the two pistons are restored to the relative position shown in Figure 1 and the free circulation of the pressure medium is permitted. In adjustment it will be noted that the position of the threaded spindle 37 determines the left hand position of the small piston 14 relative to the tool structure K, and hence the position of the tool structure K with respect to bed B when the tool is withdrawn from the work. Similarly, the large piston 22 when present at the right hand end of its cylinder determines the farthest advance of the tool toward or into the work, and this position may be regulated with respect to the bed B by the adjustment of the threaded spindle 27. Since the piston rod 23 carries the clamping and limit piece 25, it normally is unnecessary to adjust the collar 100 in passing from one distance of travel to another, but an adjustment thereof may be made to determine the relative sensitiveness of the device in responding to varied conditions.

It is obvious that the invention is not limited to the form of embodiment shown, but that this may be modified in many ways within the scope of the appended claims.

Having thus described the invention, what I claim as new and desire to secure by Letters Patent, is:

1. A machine tool unit including a tool operating by reciprocating action, a frame, a tool supporting body reciprocable relative to said frame, said body having cylinders, independent first and second pistons in said cylinders adapted to abut one against another in the withdrawn position of said body, a source of fluid under pressure, a manually operable spring valve adapted in one position to permit the passage of fluid from said source to one end of the first piston whereby to produce a rapid approach feeding of the tool to the work, means for limiting the relative movement of said first piston in its cylinder, a by-pass controlled by said first piston and opened in the limit position thereof to permit the passage of fluid to one side of said second piston whereby to continue the feeding movement of the tool, a detent for holding said valve in said feeding position during the feeding movement of the tool, means operated by the body at the end of its feeding movement for releasing said detent, and means controlled by said valve when released by its detent for admitting fluid to the opposite side of said second piston for producing a withdrawal movement of said body.

2. A machine tool unit as in claim 1, including cooperative means on said pistons operative in the withdrawn position of said body to permit the passage of fluid from said valve and cylinder.

3. A machine tool unit including a tool operated by reciprocating action, a frame, a tool supporting body reciprocable relative to said frame and including cylinders, first and second pistons in said cylinders, valve means for selectively admitting fluid to one end of one said piston and to the other end of the other said piston, one of said pistons having an axial passage therein from one end to the other, check valves for preventing passage of fluid in either direction in said passage, and means on the other piston for moving one said check valve from its seat.

4. A machine tool unit including a tool operating by reciprocating action, a frame, a tool supporting body reciprocable relative to said frame and having coaxial smaller and larger cylinders, separate smaller and larger pistons in said cylinders, each said piston having an axial passage from one end to the other, check valves for closing said passages against movement of fluid therethrough in one direction, a source of fluid under pressure, and valve means for selectively controlling the admission of fluid to one end of said smaller cylinder and to the other end of the other said cylinder, and a restricted outlet for fluid from the end of the larger cylinder to which fluid may be admitted by said valve means, whereby the admission of fluid into said smaller cylinder produces a rapid forward feeding movement during which fluid may flow from one face of the larger piston to the other through the check valve of the passage of said piston, said smaller cylinder and piston including means for the delivery of fluid to said larger cylinder when said smaller cylinder and piston are in a predetermined relative position, fluid being permitted from the opposite face of said larger piston through said restricted outlet for a slow forward feeding, said valve means also selectively controlling the admission of fluid to said restricted outlet end of the larger cylinder for producing a rapid return movement of the body relative to the frame with an escape of fluid through the check valve of said smaller piston.

5. A machine tool unit including a tool operating by reciprocating action, a frame, a tool supporting body reciprocable relative to said frame and including coaxial cylinders, two independent pistons movable in said cylinders, each said piston having an axial passage from one end to the other, check valves for closing said passages against movement of fluid therethrough during the forward movement of the tool body relative to the frame, a second check valve in one said piston for preventing movement of fluid past the same during the withdrawal movement of the tool body, means connecting said one piston to the frame, a source of fluid under pressure, valve means for selectively controlling the admission of fluid to one end of one said piston and to the other end of the other said piston, and means on the other said piston for relieving said second check valve during an initial feeding movement of the body.

6. A machine tool unit including a tool operating by reciprocating action, a frame, a tool supporting body reciprocable relative to said frame, and including coaxial smaller and larger cylinders, two independent pistons movable in said cylinders, each said piston having an axial passage from one end to the other, a check valve for closing said passage in the smaller piston against movement of fluid therethrough during the feeding movement of the tool body, said smaller cylinder and piston including means for the delivery of fluid to said larger cylinder when said smaller cylinder and piston are in a predetermined relative position, a check valve for closing said passage in the larger piston against movement of fluid therethrough, a source of fluid under pressure, and valve means for selectively controlling the admission of fluid to one end of one said piston and to the other end of the other said piston.

7. A machine tool unit including a tool operating by reciprocating action, a frame, a tool supporting body reciprocable relative to said frame and having a pair of coaxial cylinders, two independent pistons in said cylinders adapted to abut against one another in the withdrawn position of the body, a source of fluid under pressure, valve means for selectively admitting fluid to one end of one said piston whereby to produce an initial feeding movement of the body toward the work, means to limit the movement of said one piston, means controlled by said one piston for preventing the passage of fluid to said other piston during the initial feeding and operating when the said one piston is in limit position for permitting such passage whereby said other piston causes a further feeding movement, said valve means also operating to admit fluid to the other side of said other piston whereby to produce a withdrawal movement of the body, and cooperating devices on said pistons for preventing the passage of fluid from one side of said other piston to the other while said pistons are separated and for permitting such passage when said pistons are in abutting relationship.

8. A machine tool unit including a tool operating by reciprocating action, a frame, a tool supporting body reciprocable relative to said frame and including coaxial communicating smaller and larger cylinders, smaller and larger pistons in said cylinder, means for connecting said larger piston to the frame against relative movement with respect thereto, a source of fluid under pressure, valve means for selectively admitting fluid to the end of said smaller cylinder which is remote from said larger cylinder for producing the forward feeding of the body relative to the frame and to the end of said larger cylinder which is remote from said smaller cylinder for the return of said body relative to the frame, said smaller cylinder and piston including means for passing fluid from one face of said smaller piston to the other upon a predetermined forward feeding movement whereby to deliver fluid to the end of said larger cylinder adjacent said smaller cylinder for a fine continued forward feeding movement, said larger cylinder and piston including a passage for fluid from one face of said larger piston to the other and a device for normally closing said passage and operated by said smaller piston during said predetermined feeding movement for permitting the passage of fluid through said passage, and a restricted outlet for controlling the escape of fluid from the end of said larger cylinder remote from the smaller cylinder whereby to control the fine forward feeding.

9. A machine tool unit including a tool operating by reciprocating action, a frame, a tool supporting body reciprocable relative to said frame and including coaxial communicating smaller and larger cylinders, smaller and larger pistons in said cylinder, means for connecting said larger piston to the frame against relative movement with respect thereto, a source of fluid under pressure, valve means for selectively admitting fluid to the end of said smaller cylinder which is remote from said larger cylinder for producing the forward feeding of the body relative to the frame and to the end of said larger cylinder which is remote from said smaller cylinder for the return of said body relative to the frame, said smaller cylinder and piston including means for passing fluid from one face of said smaller piston to the other upon a predetermined forward feeding movement whereby to deliver fluid to the end of said larger cylinder adjacent said smaller cylinder for a fine continued forward feeding movement, said larger cylinder and piston including a passage for fluid from one face of said larger piston to the other and a device for normally closing said passage and operated by said smaller piston during said predetermined feeding movement for permitting the passage of fluid through said passage, a restricted outlet for controlling the escape of fluid from the end of said larger cylinder remote from the smaller cylinder whereby to control the fine forward feeding, said smaller piston having a passage therethrough, and a check valve for closing said passage against the movement of fluid therethrough during the feeding movement of the tool body but permitting the movement of fluid therethrough when said valve means permits the passage of fluid from one face of said larger piston to the other whereby a flow of fluid may continue through said cylinders in the withdrawn position of the body relative to the frame.

10. A machine tool unit including a tool operated by reciprocating action, a frame, a tool supporting body reciprocable relative to said frame and having first and second cylinders, independent first and second pistons in said cylinders, means for limiting the movement of said first piston in each direction relative to the body, means for limiting the movement of said body relative to said second piston in one direction, means for connecting said second piston to the frame, said body being limited in movement in the other direction relative to said second piston by abutment of said pistons, a source of fluid under pressure, selective valve means for admitting fluid from said source to one end of said first cylinder whereby to feed said body rapidly by reaction through both said pistons in abutting relationship, means controlled by said first piston and operative when said first piston is at the limit of movement relative to said body for establishing a passage for fluid into one end of said second cylinder to cause the separation of said pistons and to produce a further and slow feeding movement, and a device on said first piston to establish a passage for fluid from one face of said second piston to the other while the pistons are in abutting relationship, said selective valve means being operative also for admitting fluid to the other end of said second cylinder to produce a withdrawal movement of said body.

11. A machine tool unit including a frame, an element reciprocable relative to the frame and including two coaxial communicating cylinders, separate pistons in said cylinders, each said piston having a passage from one face thereof to the other, check valves for closing said passages against movement of fluid therethrough, a source of fluid under pressure, and valve means for selectively controlling the admission of fluid to one end of one said cylinder and to the other end of the other said cylinder, means for connecting one of said pistons to said frame, said pistons including interengaging portions so that the other said piston may operate through said one piston to produce a relative movement of said frame and element in one direction, and for opening the check valve of said one piston at a predetermined relative position of said pistons.

12. A machine tool unit comprising a frame and a body reciprocable relative to said frame, a piston connected to said frame, said body including a shaft including a tool holder, a liquid pump, a liquid sump, a motor for continuously driving said shaft and pump, means for providing a cylinder for said piston, a selective control valve for passing liquid from said pump to one end of said cylinder for producing forward traverse and feeding movements of said body relative to said frame and to the other end of said cylinder for producing a return movement of the body, a conduit and means for restricting the same for permitting the regulated escape of liquid from said other end of said sump during the forward feeding, a conduit from said valve to the sump for permitting the escape of liquid from said one end during the return movement, means providing a passage from one end of the cylinder to the other, first and second check valves for closing said passage and means for presenting said check valves in closing position and permitting movement thereof independently of one another, a first said check valve being presented by said presenting means to hold said passage closed against the pressure of fluid admitted for forward movement, a second said check valve being presented by said presenting means to prevent flow past the same when fluid is admitted for the return movement, and a second piston member operated by the fluid on its way to and from said one end of the cylinder for opening said second check valve to permit flow through said passage for an initial rapid forward movement and to permit flow through said passage when said body is in its withdrawn position relative to said frame.

13. A machine tool unit including a tool operating by reciprocating action, a frame, a tool supporting body reciprocable relative to said frame, piston and cylinder members, one of said members being fixed to the frame and the other said member fixed to the body, said piston member having a first passage extending from one face to the other, a source of fluid under pressure, a manually operable control valve to admit fluid from said source to one end of said cylinder member for producing the forward movements of said body, a detent to hold the control valve in such feeding position, means controlled by the tool body in its forward movement to release said detent whereby the control valve is moved to effect a flow of fluid to the other end of said cylinder member for the return movement of the body, double check valves for normally closing said first passage during the flow to either end of the cylinder member, a second piston member operated by the body in its return movement for opening one of said check valves and permitting the free flow of fluid through said valves and the cylinder member from the outlet to the inlet of said source when the structure is in fully returned position, means providing a second passage bypassing said second piston member, and a check valve in said second passage for closing the same during the flow of fluid for forward movement of the tool body.

14. A machine tool unit including a frame, an element reciprocable relative to the frame, piston and cylinder members, one of said members being fixed to the frame and the other said member fixed to said element, a source of fluid under pressure, a conduit including a control valve movable into a first position for admitting fluid from said source to one end of said cylinder member for producing a forward movement of said element in one direction relative to said frame, a detent for holding the control valve in said first position, means actuated upon a predetermined relative movement of the members for releasing said detent whereby to permit the control valve to move into a second position for effecting the passage of fluid to the other end of said cylinder whereby to produce a relative movement of the element and body in the opposite direction for withdrawal, means providing a first passage between the faces of the piston, double check valves in the piston for closing said first passage when fluid is being admitted to either end of the cylinder, a second piston member operated by the fluid and operative during such withdrawal movement for opening one of said check valves for permitting the free flow of fluid through said cylinder and valves when the element is in a predetermined withdrawn position relative to the frame, said second piston member having a second passage therein, and a third check valve for closing said second passage during the forward movement.

EDWARD JOSLIN KINGSBURY.